United States Patent Office
3,576,839
Patented Apr. 27, 1971

3,576,839
NOVEL ORGANIC ACID DERIVATIVES
Wilfried Draber, Maidstone, Kent, England, assignor to Shell Oil Company, New York, N.Y.
No Drawing. Filed Mar. 3, 1967, Ser. No. 620,275
Claims priority, application Great Britain, Mar. 4, 1966, 9,575/66
Int. Cl. C07c 61/36, 69/74, 61/32
U.S. Cl. 260—468
4 Claims

ABSTRACT OF THE DISCLOSURE

Plant growth regulants composed of six-membered carbocyclic substituted 1,3-butadienes such as 1-hydroxy-β-2,6,6-tetramethyl-4-oxo-2-cyclohexene-1 - penta - 2,4 - dienoic acid methyl ester.

INTRODUCTION

The use of plant growth regulators has become increasingly important in the field of agriculture. The discovery of natural plant growth regulators such as the auxins and gibberellins has been a stimulus in the search for natural and synthetic regulants. While these regulants and their synthetic counterparts and substitutes have been useful, there has been a continuing need for other classes of growth regulants which induce a broad spectrum of physiological reactions in plants.

I have now discovered a novel class of compounds which are highly effective as growth regulants.

OBJECTS

The principal object of this invention is to provide novel plant growth regulants. Another object is to provide novel plant growth regulants which are effective in pre-emergence and post-emergence applications. Still another object is to provide novel plant regulants comprising 1,3-butadiene derivatives having a six-membered carbocyclic ring as part of the structure. Another object is to provide methods of regulating plant growth comprising contacting plants with a growth regulating amount of the compounds of the invention.

STATEMENT OF THE INVENTION

It has been found that the novel 1,3-butadiene derivatives having a six-membered carbocyclic ring of the following formula are effective plant growth regulants: Q—M wherein M is

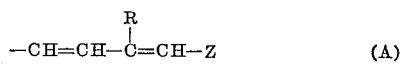

and Q represents a monovalent six-membered carbocyclic radical selected from the group consisting of

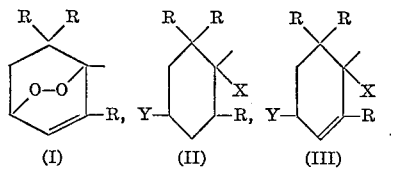

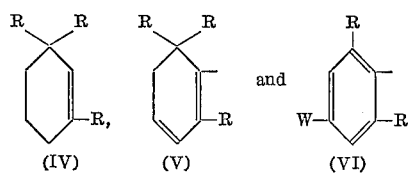

wherein:

R is hydrogen or alkyl of 1–4 carbon atoms;
W is —OH, —OR' or

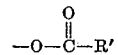

wherein R' is alkyl of 1–4 carbon atoms;

X is hydrogen or hydroxy;
Y is hydroxy, oxo, semicarbazono or

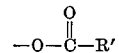

wherein R' is alkyl of 1–4 carbon atoms;

Z is selected from the group of monovalent radicals consisting of carboxy;

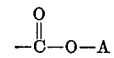

wherein A is selected from alkali metal ion, ammonium ion or substituted ammonium ion; an ester of the formula

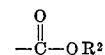

wherein $R^2$ is alkyl of 1–5 carbon atoms, aryl of up to ten carbon atoms, alkyl of 1–5 carbon atoms substituted with at least one radical selected from the group consisting of halo, nitro and alkylsulfonyl of 1–4 carbon atoms or aryl of up to ten carbon atoms substituted with at least one radical selected from the group consisting of alkyl of 1–4 carbon atoms, halo, nitro, haloalkyl of 1–4 carbon atoms and alkylsulfonyl of 1–4 carbon atoms; hydroxyalkyl of 1–4 carbon atoms; cyano; and carbamoyl of the formula

wherein T is selected from

and

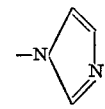

wherein $R^3$ is hydrogen, alkyl of 1–4 carbon atoms or aryl of up to ten carbon atoms;

with the first proviso that when Q is selected from the radicals II and III, M is selected from the radicals

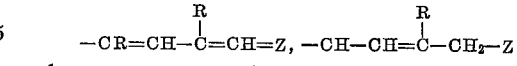

and

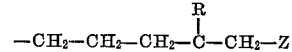

and with the second proviso that when Z is carboxy, Q is selected from radicals II–VI and with the third proviso that when Q is radical III and Z is carboxy, Y is selected from hydroxy, semicarbazono, alkoxy, or

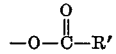

Preferred compounds are those of the above Formula A in which Z represents a carboxy group; an ester of formula —COOR, wherein R represents an alkyl group of 1–4 carbon atoms, a phenyl group, or a phenyl group substituted by a single nitro, trifluoromethyl or methylsulfonyl group; a hydroxymethyl group; a cyano group; a carbamoyl group —CONH₂ or an imidazol-1-ylcarbonyl group; R represents a methyl group; X represents hydroxy; Y represents a hydroxy group, an oxo group or a semicarbazono group, a methoxy group or an acetoxy group; and W represents hydroxy, methoxy or propionyloxy. The same provisos described previously applying to the preferred compounds.

Especially preferred compounds within the scope of the invention are those having the formula

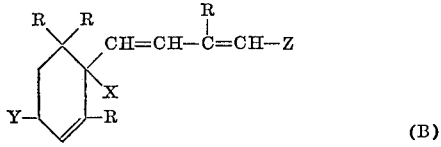

(B)

wherein Z is

—C≡N, hydroxymethyl,

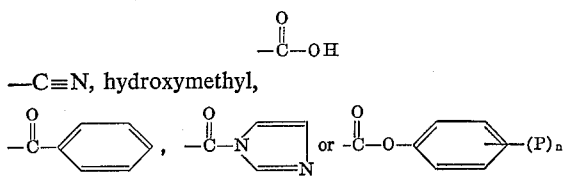

wherein P is lower alkylsulfonyl, nitro or halomethyl; each R is independently hydrogen, or lower alkyl; X is hydrogen or hydroxy; Y is hydroxy, oxo, semicarbazono or lower alkoxy; and n is 0 or 1; with the proviso that when Z is

Y is hydroxy, semicarbazono or lower alkoxy.

The halogens in the halomethyl include fluoride, chlorine, bromine and iodine with chlorine and fluorine being preferred.

The ring substituents in the group

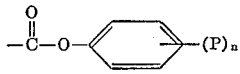

may be in the meta or para positions.

The "alkyl" in the terms "lower alkylsulfonyl," "lower alkyl" and "lower alkoxy" are defined as having 1–4 carbon atoms.

Exemplary compounds of Formula B are as follows:
when Z is

1,4-dihydroxy-β,2,6,6-tetramethyl-2-cyclohexene-1-penta-2,4-dienoic acid;
4-carbamoylhydrazono - 1 - hydroxy-β,2,6,6-tetramethyl-2-cyclohexene-1-penta-2,4-dienoic acid monohydrate;
4-ethoxy-1-hydroxy-β,2,6,6-tetramethyl-2-cyclohexene-1-penta-2,4-dienoic acid;
1,4-dihydroxy-β,2-dimethyl-2-cyclohexene-1-penta-2,4-dienoic acid and the like;

when Z is —C≡N;

1-hydroxy-β,2,6,6-tetramethyl-4-oxo-2-cyclohexene-1-penta-2,4-dienonitrile;
1,4-dihydroxy-β,2,6,6-tetramethyl-2-cyclohexene-1-penta-2,4-dienonitrile;
β,2,6,6-tetramethyl-4-oxo-2-cyclohexene-1-penta-2,4-dienonitrile and the like;

when Z is hydroxyalkyl;

1-hydroxy-4-methoxy-β,2,6,6-tetramethyl-2-cyclohexene-1-penta-2,4-dienol;
1,4-dihydroxy-β,2,6,6-tetramethyl-2-cyclohexene-1-penta-2,4-dienol;
1-hydroxy-4-oxo-β,2,6,6-tetramethyl-2-cyclohexene-1-penta-2,4-dienol;

1-hydroxy-4-methoxy-β,2,6,6-tetramethyl-2-cyclohexene-1-hexa-3,5-dienol and the like;

when Z is

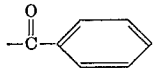

4-hydroxy-4-(benzoyl-3-methylbuta-1,3-dienyl)-3,5,5-trimethylcyclohex-2-en-1-one;
4-hydroxy-4-(4-benzoyl-3-methylbuta-1,3-dienyl)-3,5,5-trimethylcyclohex-2-en-1-ol;
3-methyl-5-(1-hydroxy-4-methoxy-2,6,6-trimethyl-2-cyclohexen-1-yl)-2,4-pentadienophenone and the like.

when Z is

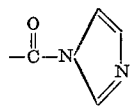

1-hydroxy-β,2,6,6-tetramethyl-4-oxo-2-cyclohexene-1-penta-2,4-dienoic acid imidazolide;
1,4-dihydroxy-β,2,6,6-tetramethyl-2-cyclohexene-1-penta-2,4-dienoic acid imidazolide;
1-hydroxy-β,2,6,6-tetramethyl-4-methoxy-2-cyclohexene-1-penta-2,4-dienoic acid imidazolide and the like;

when Z is

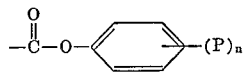

1-hydroxy-β,2,6,6-tetramethyl-4-oxo-2-cyclohexene-1-penta-2,4-dienoic acid phenyl ester;
1,4-dihydroxy-β,2,6,6-tetramethyl-2-cyclohexene-1-penta-2,4-dienoic acid phenyl ester;
4-carbamoylhydrazo-1-hydroxy-β,2,6,6-tetramethyl-2-cyclohexene-1-penta-2,4-dienoic acid phenyl ester;
1-hydroxy-β,2,6,6-tetramethyl-4-methoxy-2-cyclohexene-1-penta-2,4-dienoic acid;
1-hydroxy-β,2,6,6-tetramethyl-4-oxo-2-cyclohexene-1-penta-2,4-dienoic acid p-methylsulfonylphenyl ester;
1-hydroxy-β,2,6,6-tetramethyl-4-oxo-2-cyclohexene-1-penta-2,4-dienoic acid p-ethylsulfonylphenyl ester;
1 - hydroxy - β,2,6,6-tetramethyl-4-oxo-2-cyclohexene-1-penta-2,4-dienoic acid p-nitrophenyl ester;
1 - hydroxy - β,2,6,6-tetramethyl-4-oxo-2-cyclohexene-1-penta-2,4-dienoic acid m-trifluoromethylphenyl ester;
1 - hydroxy - β,2,6,6-tetramethyl-4-oxo-2-cyclohexene-1-penta-2,4-dienoic acid dichloromethylphenyl ester;
1 - hydroxy - β,2,6,6-tetramethyl-4-oxo-2-cyclohexene-1-penta-2,4-dienoic acid monofluoromethylphenyl ester and the like.

It will be readily appreciated that the compounds having the above general formula may exist as geometric isomers having cis or trans configuration with respect to the double bonds in the carbon chain. Moreover, there may be at least one asymmetric carbon atom present in the compounds and hence the possibility of stereoisomers exists. The general formulae in this specification have been represented without reference to steric configuration, and are to be construed as covering all geometric isomers. Similarly, the formulae are envisaged as including the individual stereoisomers and mixtures, racemic or otherwise, thereof.

PREPARATION

Compounds of Formulae I, II and III

The alkylated or unalkylated 5-(cyclohexa-1,3-dienyl)-2,4-pentadienoic acids, which are the starting materials for preparing the novel compounds represented by Formulae I, II and III above, are known in the art (Helv. Chim. Acta 45, 528 (1962)). The epidioxides of Formula I are prepared by reacting the above acids with activated oxygen in liquid phase. The oxygen may be activated using visible light and a photosensitizing agent. The epidioxide, after isolation, is then further treated to yield the epidoxy compounds falling within the scope of the general formula in which Q has the structure of Formula I. The compounds of Formulae II and III are prepared by initially preparing the epidoxide as described above, rearranging them by heating in the presence of sodium hydroxide and finally acidifying to form the acid. The acid is then further treated, as described below, to form the compounds coming within the scope of Formulae II and III. The process of forming the epidioxide and acid starting materials has been described in the literature (Nature 206, 715, (1965)).

Compounds in which Z is an ester can be prepared by reacting in liquid phase the acid with an alkyl iodide and silver oxide in the presence of an ether solvent. Esters may also be prepared by reacting the appropriate imidazolide with an alkali metal salt of the appropriate alcohol or phenol. This method is readily used to form the phenyl esters and the substituted phenyl esters of Formulae I–III including those in Formula B. The imidazolide is prepared by reacting in liquid phase the acid with 1,1'-carbonyldimidazole using an ether as the solvent. By further reacting the acid imidazolide with ammonia or the appropriate amine, the other carbamoyl compounds of the invention are formed. An additional method of preparing esters includes reacting the acid with diazo compounds, i.e., diazomethane reacts to yield the methyl ester.

The alcohols may be prepared by reacting a suitable ester of the acid with an inorganic reducing agent such as lithium aluminum hydride in the presence of an ether solvent. In preparing higher alcohols than the penta-2,4-dienol by this method, the longer chain length acids, of course, must be employed. These acids are also known in the art.

The compounds having the fully saturated carbocyclic radical of Formula II are prepared by hydrogenating the 2-cyclohexen-1-yl-1,3-butadienyl compound with hydrogen in liquid phase in the presence of a hydrogenation catalyst such as palladized charcoal. By similar techniques, the 1,3-butadienylene radical can be partially or completely hydrogenated.

When Z represents a cyano group the hydroxy-ketone compounds may be prepared by the photochemical oxygenation and subsequent base-catalyzed rearrangement of β,2,6,6-tetramethyl-1,3-cyclohexadiene - 1 - pentadienonitrile.

The 1,4-dihydroxy compounds are readily prepared by reduction of the 4-oxo group with an alkali metal hydride such as sodium borohydride in an alcohol solution. This technique also produces the corresponding ester of the alcohol.

The 4-alkoxy grouping is prepared by the same method used for esters, i.e., alkyl halide and silver oxide in ether solvent, except that the ester is used as the reactant instead of the acid.

Compounds of Formula VI

These compounds may be prepared by reacting 4-acetoxybenzalacetone under reducing conditions in liquid phase with an alkyl haloacetate. The ester obtained from this reaction may be hydrolyzed under basic conditions to yield the corresponding acid.

UTILITY

The compositions of the invention may be formulated in any of the ways known for biocidal compositions. Thus the compositions may take the form of dusts, granules, wettable powders, solutions, emulsifiable concentrates, emulsions and aerosol spray compositions. These compositions may comprise a carrier or a surface active agent or both a carrier and a surface active agent. The carrier may be a solid or a liquid and may be of synthetic or natural origin. Examples of solid carriers are china clays, silicates, synthetic hydrated silicon oxides, resins, waxes, polymeric materials and elemental substances. With certain solid carriers a stabilizer for one or more of the active ingredients may be necessary, for example ethylenediamine tetra-acetic acid. Examples of suitable liquid carriers are water, alcohols, ketones, aromatic hydrocarbons, chlorinated hydrocarbons, petroleum fractions and liquefied, normally vaporous or gaseous, organic compounds. Mixtures of different liquids are often suitable.

The surface active agent may be a wetting agent, an emulsifying agent, a dispersing agent or a sticker; it may be ionic or nonionic. Examples of suitable surface active agents are the sodium or calcium salts of polyacrylic acids, the condensation products of fatty acids or aliphatic amines or amides containing at least 12 carbon atoms in the molecule with ethylene oxide and/or propylene oxide; partial esters of such fatty acids with glycerol, sorbitan, sucrose or pentaerythritol; condensation products of alkyl phenols with ethylene oxide or propylene oxide and sulfates or sulfonates of such condensation products; and alkali metal salt or sulfuric acid esters or sulfonic acids containing at least 10 carbon atoms in the molecule, such as sodium lauryl sulfate.

The compositions of the invention may contain other ingredients, for example, colloids such as gelatin, glue, casein, gums and polyvinyl alcohol; sodium polyphosphates, cellulose ethers or other biocidally active substances such as, for example, insecticides or fertilizers.

The compounds according to the invention and compositions containing them are used as plant growth regulants, i.e., to modify the growth of plants or plant structures. The effects produced depend upon the time of application, the concentration used, the species of plant and the point of application. The effects may be grouped broadly into those obtained from pre-emergence application and those obtained from post-emergence application.

Just as the effects vary with the variables of plant, time of application, point of application, etc., so does the concentration necessary for a desired response. For these reasons, the minimum concentration required to produce the desired response is defined as the growth regulating amount. Those skilled in the art, however, may readily determine the optimum amount under the particular circumstance, e.g., by the use of controls.

In pre-emergence applications, the compounds or compositions containing them, may be applied to the subterranean portions of the plant, e.g., roots, seeds, bulbs, corms, rhizomes or tubers, before planting or the compounds may be applied to the soil before or after planting the crop. Used in this way the compounds and their compositions may be used as herbicides and to delay the germination of seeds. It has been found that, when used as pre-emergence herbicides, the compounds and their compositions show selective activity. It appears that cereals and cotton are very tolerant of their application. In contrast with many known pre-emergence herbicides the compositions of the invention persist for only a very short time in the soil and this confers a freedom of rotational cropping which is not possible with persistent herbicides.

In post-emergence application the compounds are applied to the aerial parts of growing plants. This includes application to mature trees and bushes in addition to recently-emerged seedlings and established crops. Post-emergence uses for the compounds include defoliation and the effect of leaf senescence.

The novel compounds, processes for their preparation and their biocidal activity are further illustrated in the examples that follow.

Example I.—Preparation of 1,4-epidioxy-β,2,6,6-tetramethyl-2-cyclohexene-1-penta-cis-2-trans-4-dienoic acid methyl ester

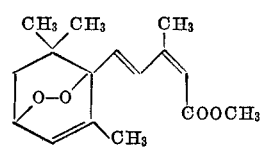

(a) A solution of β,2,6,6-tetramethyl - 1,3 - cyclohexadiene-1-penta-cis-2-trans-4-dienoic acid (450 mg.) and eosin (5 mg.) in benzene (50 ml.)/ethanol (50 ml.) was cooled and stirred for 1½ hours under irradiation by a bank of fluorescent lamps while oxygen was passed through.

Evaporation of the solvent under vacuo followed by crystallization of the residue from diethyl ether yielded 1,4-epidioxy-β,2,6,6-tetramethyl - 2 - cyclohexene-1-penta-cis-2-trans-4-dienoic acid, M.P. 165–168° C.

(b) A sample of 1,4-epidioxy-β,2,6,6 - tetramethyl - 2-cyclohexene - 1 - penta-cis - 2 - trans-4-dienoic acid (31.5 mg.) was treated with excess diazomethane in ether and allowed to stand at 0–5° C. for 1 hour.

Evaporation of the solvent followed by crystallization of the residue from ether/petroleum ether yielded 1,4-epidioxy - β,2,6,6 - tetramethyl - 2 - cyclohexene-1-penta-cis-2-trans-4-dienoic acid methyl ester, M.P. 76–77° C.

Analysis.—$C_{16}H_{22}O_4$ requires (percent): C, 69.5; H, 7.3. Found (percent): C, 69.3; H, 7.4.

Example II.—Preparation of 1,4 - epidioxy β,2,6,6-tetramethyl - 2 - cyclohexene - 1 - penta-trans - 2-trans-4-dienoic acid methyl ester

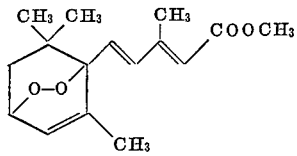

(a) A solution of β,2,6,6 - tetramethyl-1,3-cyclohexadiene - 1 - penta - trans-2-trans-4-dienoic acid (500 mg.) and eosin (5 mg.) in benzene (50 ml.)/ethanol (50 ml.) was cooled and stirred during the passage of oxygen for 1¾ hours while being irradiated as described in Example I(a).

Evaporation of the solvent under vacuo followed by recrystallization of the residue from benezene/petroleum ether yielded 1,4 - epidioxy-β,2,6,6- tetramethyl-2-cyclohexene - 1 - penta - trans-2-trans-4-dienoic acid, M.P. 154–156° C.

(b) A sample of 1,4-epidioxy - β,2,6,6-tetramethyl-2-cyclohexene - 1 - penta-trans-2-trans-4-dienoic acid (69.4 mg.) was treated with excess diazomethane in ether and allowed to stand at 0–5° C. for 1 hour.

Filtration, followed by evaporation of the solvent yielded 1,4 - epidioxy - β,2,6,6-teramethyl-2-cyclohexene-1 - penta - trans-2-trans-4-dienoic acid methyl ester, as a yellow oil.

Analysis.—$C_{16}H_{22}O_4$ requires (percent): C, 69.5; H, 7.3. Found (percent): C, 69.7; H, 7.5.

Example III.—Preparation of 1 - hydroxy-β,2,6,6-tetramethyl - 4 - oxo - 2 - cyclohexene-1-penta-cis-2-trans-4-dienoic acid methyl ester

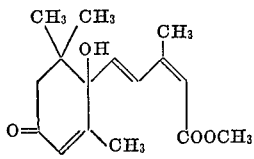

(a) 1 - hydroxy - β,2,6,6 - tetramethyl-4-oxo-2-cyclohexene - 1 - penta - cis-2-trans-4-dienoic acid (0.5 g.) was dissolved in ether and treated with a slight excess of diazomethane at 0–5° C. for 1 hour. Evaporation and crystallization from ether/petroleum ether afforded colorless crystals of 1 - hydroxy - β,2,6,6-tetramethyl-4-oxo-2-cyclohexene - 1 - penta - cis-2-trans-4-dienoic acid methyl ester, M.P. 90–92° C.

(b) 1 - hydroxy - β,2,6,6 - tetramethyl-4-oxo-2-cyclohexene - 1 - penta - cis-2-trans-4-dienoic acid (5.0 g.) was dissolved in ether (250 ml.). Silver oxide (12.0 g.) and methyl iodide (20 g.) were added and the mixture stirred for 1½ hours at 20° C. then for 1 hour at reflux. The solution was filtered, the residue washed thoroughly with ether and the filtrates evaporated. A yellow oil (5 g.) was obtained, which solidified in the refrigerator. Chromatography on silica gel using ether/petroleum ether (2:3) as eluant solvent followed by recrystallization gave 4.5 g. of the methyl ester, M.P. 90–92° C. The analytically pure sample melted at 95° C.

Analysis.—$C_{16}H_{22}O_4$ requires (percent): C, 69.5; H, 7.3. Found (percent): C, 69.2; H, 7.5.

Example IV.—Preparation of 1,4 - dihydroxy - β,2,6,6-tetramethyl - 2 - cyclohexene - 1 - penta-cis-2-trans-4-dienoic acid methyl ester (as two stereo-isomers)

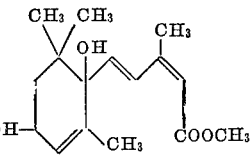

1 - hydroxy - β,2,6,6 - tetramethyl-4-oxo-2-cyclohexene-1 - penta- cis - 2 - trans-4-dienoic acid (1.0 g.) was dissolved in methanol (10 ml.). Sodium borohydride (0.3 g.) at −10° C. to −15° C. was added and the solution stirred for 1 hour. After storage at 0° C. for 15 hours the solution was poured onto a mixture of concentrated hydrochloric acid (5 ml.) and ice (100 g.). This mixture was then extracted 3 times with ether and the ether phase washed with potassium carbonate solution. The ether was dried and evaporated to give 0.97 g. of viscous oil. Chromatography on silica gel using ether/petroleum ether (2:1) as eluant solvent gave two different fractions. The first (0.26 g.) was recrystallized from ether/petroleum ether to give a product melting at 114–115° C. The second fraction (0.38 g.) remained as an oil. The $R_F$ values of the two fractions were determined on a thin-layer chromatographic plate using Kieselgel with hexane/ethyl acetate (1:1) as solvent.

Analysis.—$C_{16}H_{24}O_4$ requires (percent): C, 68.6; H, 8.5. Found: Fraction 1—M.P. 114–115° C. (percent): C, 68.7; H, 8.5; $R_F$, 0.44. Fraction 2—oil (percent): C, 68.3; H, 8.2; $R_F$, 0.30.

Example V.—Preparation of 1 - hydroxy - β,2,6,6-tetramethyl - 4 - oxo - 2-cyclohexene-1-penta-cis-2-trans-4-dienoic acid imidazolide

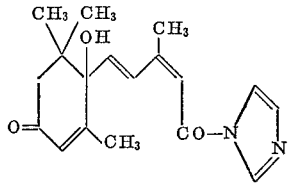

1 - hydroxy - β,2,6,6-tetramethyl-4-oxo-2-cyclohexene-1 - penta - cis - 2 - trans - 4 - dienoic acid (5.0 g.) was suspended in dry tetrahydrofuran (10 ml.). A tetrahydrofuran solution containing an equimolecular amount of freshly-prepared 1,1' - carbonyldiimidazole was added under nitrogen. The mixture was stirred for ½ hour, evaporated and methanol and water were added. The mixture was cooled to 0° C. and filtered. The yellowish crystals were washed with cold water and dried. Yield 4.01 g. M.P. 165–175° C. with decomposition. Acidification and extraction of the aqueous filtrates gave a recovery of 0.73 g. of the starting acid.

Analysis.—$C_{18}H_{22}O_3$ requires (percent): C, 68.8; H, 7.0. Found (percent): C, 68.1; H, 7.9.

Example VI.—Preparation of β,2,6,6-tetramethyl-1,3-cyclohexadiene-1-penta-cis/trans - 2 - trans-4-dienonitrile (as a mixture of two geometric isomers)

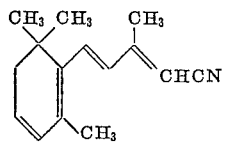

A solution of β,2,6,6-tetramethyl - 1 - cyclohexene-1-penta-cis/trans-2-trans-4-dienonitrile (50 g.) in dry methylene chloride (200 ml.) containing a suspension of sodium bicarbonate (19.1 g.) and calcium oxide (12.2 g.) was stirred under nitrogen at 5–10° C. for 4 hours during the addition of N-bromosuccinimide (4.3 g.). After completion of the addition the mixture was stirred at room temperature overnight, quinoline (32 ml.) was then added and the mixture was filtered. The methylene chloride was removed from the filtrate under reduced pressure and a further quantity of quinoline (32 ml.) was added to the residue.

The resultant quinoline solution was heated for 1 hour on a steambath, cooled, poured into an excess of ice-cold 3 N sulfuric acid and the crude product extracted with petroleum ether (3× 100 ml.). The extract was washed with water followed by 5% sodium bicarbonate solution and further portions of water and dried over magnesium sulfate. Evaporation of the solvent followed by distillation of the residue gave β,2,6,6-tetramethyl-1,3-cyclohexadiene-1-penta-cis/trans-2-trans-4-dienonitrile as a mixture of two geometric isomers, B.P. 110–112° C./0.4 mm. Hg.

*Analysis.*—$C_{15}H_{19}N$ requires (percent): C, 84.4; H, 9.0; N, 6.6. Found (percent): C, 84.0; H, 8.8; N, 6.2.

Example VII.—Preparation of 1-hydroxy-β,2,6,6-tetramethyl - 4 - oxo - 2 - cyclohexene-1-penta-trans-2-trans-4-dienonitrile

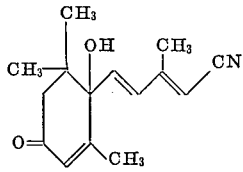

A sample of β,2,6,6-tetramethyl-1,3-cyclohexadiene-1-penta-cis/trans-2-trans-4-dienonitrile (20 g.) prepared as in Example VI above was dissolved in benzene/methanol (1:1, 600 ml.) containing eosin (0.05 g.). The solution was illuminated by a bank of fluorescent lamps and a steady stream of oxygen was passed through at atmospheric pressure for 3 days. The solution was stirred and kept below 20° C. during this time. The solvent was removed under reduced pressure and the residue was purified by chromatography on neutral alumina using ether/petroleum ether as eluant. The resulting crude epidioxide (18.24 g.) was obtained from the early fractions.

A sample of the epidioxide (9 g.) was refluxed for 30 minutes with methanolic potassium hydroxide solution (potassium hydroxide 7 g./water 90 ml./methanol 900 ml.). The reaction mixture was then cooled, diluted with water (200 ml.) and extracted with ether (3× 100 ml.). The ether extract was dried and evaporated to leave a dark oil (7.57 g.). A portion of this oil (6 g.) was purified by chromatography on neutral alumina using ether/petroleum ether (1:1), followed by ether, as eluant solvent. A mixture of nitriles was obtained upon evaporation of the ether fractions, from which the required compound crystallized and was separated. The crystalline material (1.89 g.), M.P. 165–170° C., sublimed readily at 155–160° C./0.1 mm. to give analytically pure material, as colorless prisms, M.P. 172–173° C.

*Analysis.*—$C_{15}H_{19}NO_2$ requires (percent): C, 73.5; H, 7.8; N, 5.7. Found (percent): C, 73.3; H, 7.4; N, 5.9.

Example VIII.—Preparation of 1-hydroxy-4-methoxy-β,2,6,6-tetramethyl - 2 - cyclohexene-1-penta-cis-2-trans-4-dienoic acid methyl ester

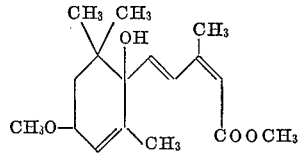

A sample of 1,4-dihydroxy-β,2,6,6-tetramethyl-2-cyclohexene-1-penta-cis-2-trans-4-dienoic acid methyl ester (0.5 g.) prepared as in Example IV was refluxed under nitrogen for 29 hours with methyl iodide (10 ml.) and silver oxide (2 g.). After cooling the reaction mixture was filtered, the precipitate washed with ether and the solvent removed from the combined filtrate and washings by evaporation.

Partial crystallization of the residual oil took place on storage at 0° C. Separation and recrystallization of the solid from petroleum ether yielded 1-hydroxy-4-methoxy-β,2,6,6 - tetramethyl - 2 - cyclohexene-1-penta-cis-2-trans-4-dienoic acid methyl ester, M.P. 97–98° C. (β stereoisomer).

*Analysis.*—$C_{17}H_{26}O_4$ requires (percent): C, 69.4; H, 8.8. Found (percent): C, 69.4; H, 8.7.

Example IX.—Preparation of 1-hydroxy-4-methoxy-β,2,6,6-tetramethyl - 2 - cyclohexene-1-penta-cis-2-trans-4-dienol

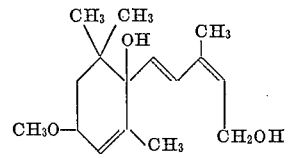

A sample of 1-hydroxy-4-methoxy-β,2,6,6-tetramethyl-2-cyclohexene-1-penta-cis - 2 - trans-4-dienoic acid methyl ester (0.35 g.) prepared as in Example VIII above was dissolved in anhydrous ether (25 ml.) and added to lithium aluminum hydride (0.29 g.) in anhydrous ether (50 ml.) maintained at 0° C. under an atmosphere of nitrogen. The mixture was stored at 0° C. overnight and ethyl acetate (10 ml.) and aqueous hydrochloric acid then added.

Extraction of the acidified solution with successive portions of ether and removal of the solvent from the extract by evaporation yielded 1-hydroxy-4-methoxy-β,2,6,6-tetramethyl - 2 - cyclohexene-1-penta-cis-2-trans-4-dienol as a colorless oil.

Further purification of the product was carried out by chromatography on a silica gel column using ether/petroleum ether as eluant.

*Analysis.*—$C_{16}H_{26}O_3$ requires (percent): C, 72.1; H, 9.8. Found (percent): C, 69.0; H, 9.1.

Example X.—Preparation of β,2,6,6-tetramethyl-1,3-cyclohexadiene-1-penta-trans-2-trans-4-dienamide

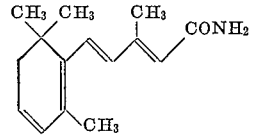

To a solution of 1,1'-carbonyldiimidazole (6.6 g.) in anhydrous tetrahydrofuran was added β,2,6,6-tetramethyl-1,3 - cyclohexadiene-1-penta-trans-2-trans-4-dienoic acid. After 30 minutes, ammonia (25 ml. 0.880 SG) was added and the mixture was stirred at room temperature for 3 hours.

Extraction of the reaction mixture with methylene chloride followed by evaporation of the solvent and recrystallization of the residue from benzene/cyclohexane yielded β,2,6,6 - tetramethyl-1,3-cyclohexadiene-1-penta-trans-2-trans-4-dienamide, M.P. 124–126° C.

*Analysis.*—C₁₅H₂₁NO requires (percent): C, 79.0; H, 8.7. Found (percent): C, 79.4; H, 9.3.

Example XI.—Preparation of 5-(p-acetoxyphenyl)-3-methyl-penta-trans-2-trans-4-dienoic aci dethyl ester

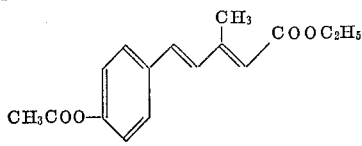

A solution of 4-acetoxybenzalacetone (51 g.) and ethyl bromoacetate (43.9 g.) in dry benzene (100 ml.) was added dropwise to a mixture of zinc foil (17 g.) and benzene (50 ml.) containing a crystal of iodine. The reaction was initiated by gentle warming, after which the reactants were added at such a rate as to sustain continuous reflux of the benzene. After completion of the addition (20 minutes) the mixture was heated under reflux for a further ½ hour.

After cooling the solution was stirred vigorously with 20% v./v. acetic acid solution (100 ml.); the organic layer was separated and washed successively with water, sodium bicarbonate solution and further portions of water before being dried over magnesium sulfate. Evaporation of the solvent gave an oil which was dissolved in benzene (250 ml.) and refluxed for 1½ hours with p-toluenesulfonic acid (1.2 g.) for the removal of water.

The benzene layer was again washed with water, sodium bicarbonate solution and further portions of water before being dried over magnesium sulfate. Evaporation of the solvent gave 5-(p-acetoxyphenyl)-3-methyl-penta-trans-2-trans-4-dienoic acid ethyl ester which, on crystallization from ether had M.P. 95–96° C.

*Analysis.*—C₁₆H₁₈O₃ requires (percent): C, 70.0; H, 6.6. Found (percent): C, 70.0; H, 6.5.

Example XII.—Preparation of 5-(p-hydroxyphenyl)-3-methyl-penta-cis-2-trans-4-dienoic acid ethyl ester

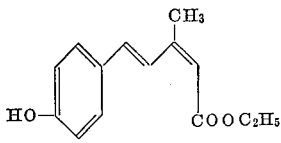

Evaporation of the mother liquor resulting from the crystallization of the compound prepared in Example XI above yielded a red-brown oil. This oil was chromatographed on neutral alumina using benzene/chloroform (1:1 v./v.) as eluant and a yellow band was observed to separate.

Evaporation of the solvent fractions containing this band yielded 5-(p-hydroxyphenyl)-3-methyl-penta-cis-2-trans-4-dienoic acid ethyl ester, which on crystallization from absolute ethanol had M.P. 164–165° C.

Assignment of configuration to the compound was made on the basis of its nuclear magnetic resonance spectrum.

*Analysis.*—C₁₄H₁₆O₃ requires (percent): C, 72.3; H, 6.9. Found (percent): C, 72.1; H, 6.8.

Example XIII.—Preparation of 1-hydroxy-β,2,6,6-tetramethyl-4-oxo-cyclohexane-1-pentanoic acid methyl ester

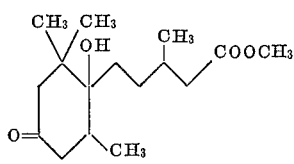

A sample of 1-hydroxy-β,2,6,6-tetramethyl-4-oxo-2-cyclo-hexene-1-penta-cis-2-trans-4-dienoic acid methyl ester (0.246 g.), prepared as in Example III, was dissolved in ethanol (25 ml.) and hydrogenated at room temperature in the presence of 10% palladized charcoal (0.158 g.) until uptake of hydrogen was complete. The solution was filtered and the colorless oil obtained by removal of the solvent from the filtrate was chromatographed on silica gel using ether/petroleum ether (1:1 v./v.) as eluant.

Two separate fractions were obtained as a result of this chromatography. The first showed no ultra-violet absorbtion above 210 mμ indicating an absence of conjugated double bonds. The second fraction showed an ultraviolet absorbtion peak at 239 mμ indicating the presence of a cyclohexenone impurity.

The combined fractions (0.224 g.) were subjected to a second hydrogenation for 10 minutes during which no significant uptake of hydrogen was observed. After this second hydrogenation the solution was filtered, the solvent evaporated and the resultant colorless oil again chromatographed on silica-gel using ether/petroleum ether (1:1 v./v.) as eluant.

Removal of the solvent from the eluate yielded a colorless oil (0.167 g.). Spectroscopic examination of this oil indicated the presence of approximately 10% of a compound containing a cyclohex-2-en-4-one structure as an impurity, while IR analysis showed only a very small absorption at the frequency corresponding to a conjugated double bond.

*Analysis.*—Found (percent):C, 70.4; H, 10.0. C₁₆H₂₈O₄ requires (percent): C, 67.7; H, 9.9. C₁₆H₂₄O₄ requires (percent): C, 68.1; H, 9.3.

Example XIV.—Preparation of 1-hydroxy-β,2,6,6-tetramethyl-4-oxo-2-cyclohexene - 1 - penta-cis/trans-3-enoic acid methyl ester

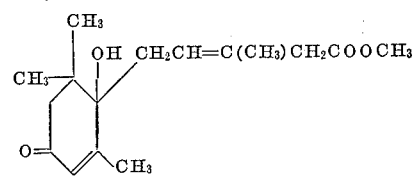

A sample of 1-hydroxy-β,2,6,6-tetramethyl-4-oxo-2-cyclohexene-1-penta-cis-2-trans-4-dienoic acid methyl ester (0.205 g.) prepared as in Example III was dissolved in a mixture of cyclohexane (60 ml.) and ethanol (20 ml.) and hydrogenated at room temperature in the presence of 10% palladized charcoal (0.16 g.). Hydrogenation was continued for 40 minutes after which time 110% of the theoretical amount of hydrogen had been absorbed. The solution was filtered and the colorless oil obtained by removal of the solvent from the filtrate was chromatographed on silica gel using ether/petroleum ether (1:1 v./v.) as eluant.

Evaporation of the solvent from the eluate followed by crystallization of the residue yielded 1-hydroxy-β,2,6,6-tetramethyl-4-oxo - 2 - cyclohexene - 1 - penta-cis/trans-3-enoic acid methyl ester, M.P. 28° C. This compound was shown by mass spectrometry to have a molecular weight of 280 in accordance with the theoretical value.

*Analysis.*—Found (percent): C, 68.2; H, 9.3. C₁₆H₂₄O₄ requires (percent): C, 68.6; H, 8.7.

Example XV.—Preparation of 1-hydroxy-β,2,6,6-tetramethyl - 4 - oxo - 2 - cyclohexene-1-penta-cis-2-trans-4-dienoic acid phenyl ester

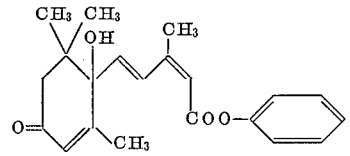

A mixture of 1-hydroxy-β,2,6,6-tetramethyl-4-oxo-2-cyclohexene-1-penta-cis-2-trans-4-dienoic acid imidazolide (0.340 g.), prepared as in Example V above, phenol (15 g.) and metallic sodium (ca. 0.002 g.) was warmed and stirred under an atmosphere of nitrogen until the sodium dissolved. Stirring was continued at room temperature overnight, after which the reaction mixture was diluted with ether/petroleum ether and the solvent layer washed with successive portions of water and sodium carbonate solution.

The solvent solution was evaporated to dryness under reduced pressure and the residue purified by chromatography on a silica gel column using ether/petroleum ether as eluant. Crystallization from the same solvent gave 1 - hydroxy-β,2,6,6-tetramethyl - 4 - oxo-2-cyclohexene-1-penta-cis-2-trans-4-dienoic acid phenyl ester, M.P. 146–147° C.

*Analysis.*—Found (percent): C, 74.0; H, 7.1. $C_{21}H_{24}O_4$ requires (percent): C, 74.1; H, 7.1.

Example XVI.—Preparation of 4-hydroxy-4-(4-benzoyl-3-methylbuta - trans-1-cis-3-dienyl)-3,5,5-trimethylcyclohex-2-en-1-one

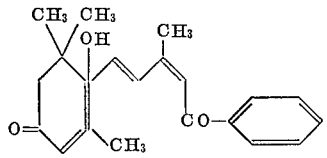

A solution of phenylmagnesium bromide (640 mg.) in dry tetrahydrofuran (8.5 ml.) was added dropwise over 30 minutes to a stirred suspension of 1-hydroxy-β,2,6,6-tetramethyl-4-oxo-2-cyclohexene - 1 - penta-cis-2-trans-4-dienoic acid imidazolide (1.0 g.), prepared as in Example V, in dry tetrahydrofuran (30 ml.). The reaction mixture was cooled in ice-water during the addition and maintained at 0° C. for 2 hours after completion of the addition followed by a further 16 hours standing at room temperature.

The solution was acidified with 2 N hydrochloric acid, evaporated to small bulk and extracted with ether. The ether extract was washed with successive portions of sodium carbonate solution and water. The solvent was then removed by evaporation and the residual oil purified by chromatography on silica gel using ether/benzene as eluant.

Further chromatography on silica gel, of the fraction showing maximum absorbance at 269 mμ, using ether/petroleum ether as eluant, followed by evaporation of the solvent gave 4-hydroxy-4-(4-benzoyl-3-methylbuta-trans-1-cis-3-dienyl)-3,5,5-trimethylcyclohex-2-en-1-one as a colorless oil.

Using the methods described in Examples I–XVI, or modifications of these methods, the compounds shown in Table 1 were prepared.

TABLE 1

| Name of compound | Melting point or boiling point, ° C. | Analysis, percent | | | | Example |
|---|---|---|---|---|---|---|
| | | Found | | Calculated | | |
| | | C | H | C | H | |
| 1-hydroxy-β,2,6,6-tetramethyl-4-oxo-2-cyclohexene-1-penta-trans-2-trans-4-dienoic acid methyl ester. | 125–126 | 69.6 | 7.4 | 69.1 | 7.9 | XVII |
| 1-hydroxy-β,2,6,6-tetramethyl-4-oxo-2-cyclohexene-1-penta-cis-2-trans-4-dienoic acid ethyl ester. | Oil | 68.7 | 8.3 | 69.9 | 8.3 | XVIII |
| 1-hydroxy-β,2,6,6-tetramethyl-4-oxo-2-cyclohexene-1-penta-cis-2-trans-4-dienoic acid isopropyl ester. | Oil | 70.7 | 8.6 | 70.5 | 8.5 | XIX |
| 1,4-dihydroxy-β,2,6,6-tetramethyl-2-cyclohexene-1-penta-trans-2-trans-4-dienoic acid methyl ester. | 120–121 | 68.5 | 8.2 | 68.6 | 8.5 | XX |
| 1-hydroxy-β,2,6,6-tetramethyl-4-oxo-2-cyclohexene-1-penta-cis-2-trans-4-dienoic acid n-propyl ester. | Oil | 70.8 | 8.4 | 70.5 | 8.5 | XXI |
| 1-hydroxy-β,2,6,6-tetramethyl-4-oxo-2-cyclohexene-1-penta-cis-2-trans-4-dienoic acid n-butyl ester. | Oil | 71.0 | 8.2 | 71.2 | 8.8 | XXII |
| 1-hydroxy-β,2,6,6-tetramethyl-4-oxo-2-cyclohexene-1-penta-cis-2-trans-4-dienoic acid n-pentyl ester. | Oil | 70.7 | 9.0 | 71.8 | 9.0 | XXIII |
| 1-hydroxy-4-methoxy-β,2,6,6-tetramethyl-2-cyclohexene-1-penta-cis-2-trans-4-dienoic acid methyl ester (α stereoisomer). | Oil | 68.7 | 8.4 | 69.4 | 8.8 | XXIV |
| 4-carbamoylhydrazono-1-hydroxy-β,2,6,6-tetramethyl-2-cyclohexene-1-penta-cis-2-trans-4-dienoic acid monohydrate. | 140–145 | 56.4 | 7.4 | 56.4 | 7.7 | XXV |
| 1,4-dihydroxy-β,2,6,6-tetramethyl-2-cyclohexene-1-penta-cis-2-trans-4-dienoic acid. | 158–159 | 67.9 | 8.6 | 67.7 | 8.3 | XXVI |
| 1,4-dihydroxy-β,2,6,6-tetramethyl-2-cyclohexene-1-penta-trans-2-trans-4-dienoic acid. | 160–161 | 67.8 | 8.4 | 67.7 | 8.3 | XXVII |
| β,2,6,6-tetramethyl-4-oxo-cyclohexene-1-penta-cis/trans-2-trans-4-dienoic acid methyl ester (mixture of geometric isomers). | Oil | 73.0 | 8.5 | 73.4 | 8.5 | XXVIII |
| 1-hydroxy-β,2,6,6-tetramethyl-4-oxo-2-cyclohexene-1-penta-cis-2-trans-4-dienoic acid p-methylsulfonylphenyl ester. | 161–166 | 63.2  S 7.7 | 6.3 | 63.1  S 7.7 | 6.2 | XXIX |
| 1-hydroxy-β,2,6,6-tetramethyl-4-oxo-2-cyclohexene-1-penta-cis-2-trans-4-dienoic acid m-methylsulfonyl phenyl ester. | Glassy solid | 61.6  S 8.2 | 6.1 | 63.1  S 7.7 | 6.2 | XXX |
| 1-hydroxy-β,2,6,6-tetramethyl-4-oxo-2-cyclohexene-1-penta-cis-2-trans-4-dienoic acid m-trifluoromethylphenyl ester. | Glassy solid | 63.5 | 5.2 | 63.6 | 5.8 | XXXI |
| 1-hydroxy-β,2,6,6-tetramethyl-4-oxo-2-cyclohexene-1-penta-cis-2-trans-4-dienoic acid p-nitrophenyl ester. | 158–163 | 65.5  N 3.9 | 6.1 | 65.5  N 3.9 | 6.1 | XXXII |
| β,2,6,6-tetramethyl-1-cyclohexene-1-penta-trans-2-trans-4-dienoic acid. | 126–128 | | | | | XXXIII |
| β,2,6,6-tetramethyl-(1,3-cyclohexadiene)-1-penta-cis/trans-2-trans-4-dienoic acid methyl ester (mixture of geometric isomers). | 118–126 at 0.7 mm. Hg | | | | | XXXIV |
| β,2,6,6-tetramethyl-1-cyclohexene-1-penta-cis/trans-2-trans-4-dienoic acid, methyl ester (mixture of geometric isomers). | 117–120.5 at 0.6 mm. Hg. | | | | | XXXV |
| β,2,6,6-tetramethyl-1-cyclohexene-1-penta-cis/trans-2-trans-4-dienonitrile (mixture of geometric isomers). | 125–128 at 1.2 mm. Hg. | 84.0  N 6.2 | 8.8 | 84.4  N 6.6 | 9.0 | XXXVI |
| 5-(p-methoxyphenyl)-3-methyl-penta-cis-2-trans-4-dienoic acid. | 149–150 | 71.6 | 6.4 | 71.5 | 6.5 | XXXVII |
| 5-(p-methoxyphenyl)-3-methyl-penta-trans-2-trans-4-dienoic acid. | 185–187 | 71.3 | 6.6 | 71.5 | 6.5 | XXXVIII |
| 5-(p-acetoxyphenyl)-3-methyl-penta-cis-2-trans-4-dienoic acid, ethyl ester. | 51–52 | 69.9 | 6.6 | 70.0 | 6.6 | XXXIX |
| 5-(p-hydroxyphenyl)-3-methyl-penta-cis-2-trans-4-dienoic acid. | 200–202 | 70.4 | 5.8 | 70.5 | 5.9 | XL |
| 5-(p-hydroxyphenyl)-3-methyl-penta-trans-2-trans-4-dienoic acid. | 191–192 | 70.6 | 5.8 | 70.6 | 5.9 | XLI |

Example XLII.—Preparation of a wettable powder 1-hydroxy-β,2,6,6-tetramethyl - 4 - oxo-2-cyclohexene-1-penta-cis-2-trans-4-dienoic acid methyl ester (25% g.), Tamol 731 (3% g.), Empicol LZ (2% g.) and Clay GTY (70% g.) (Tamol 731 is a polymethylacrylate anionic surfactant; Empicol LZ is sodium lauryl sulfate; Clay GTY is powdered hydrated aluminum silicate, a kaolinite china clay) were blended and hammer milled, air milled and finally reblended to give a wettable powder of small particle size.

Example XLIII.—Preparation of a wettable powder 1-hydroxy-β,2,6,6-tetramethyl - 4 - oxo-2-cyclohexene-1-penta-cis-2-trans-4-dienoic acid methyl ester (50% g.), Tamol 731 (3% g.), Empicol LZ (2% g.), Florisil (22.5% g.), silicum dioxylol No. 3 (22.5% g.) (Florisil is attapulgite of Spanish origin and silicum dioxylol No. 3 is a highly sorptive synthetic silicate) were blended and hammer milled, air milled and finally reblended to give a wettable powder of small particle size.

Example XLIV.—Preparation of a solution 1-hydroxy-β,2,6,6-tetramethyl - 4 - oxo-2-cyclohexene-1-penta-cis-2-trans-4-dienoic acid methyl ester (10% g.), Tensiofix AS (5% g.), Tensiofix D120 (5% g.), N-methylpyrrolidone/methylcyclohexanone 50/50 (to 100% ml.) (Tensiofix AS is a mixed blend of two nonionic polyethylene condensates and an anionic alkyl sulfonate and Tensiofix D120 is an ethylene oxide condensate with castor oil) were blended and dissolved in the solvent mixture at a temperature of up to 40° C. maximum.

15

Example XLV.—Determination of the herbicidal activity of the compounds

A sample of 1-hydroxy-β,2,6,6-tetramethyl-4-oxo-2-cyclohexene-1-penta-cis-2-trans-4-dienoic acid methyl ester was dissolved in acetone/water (1:1 v./v.) containing 1.25% Triton X–155. This solution was used to spray the foliage of seedling plants and soil containing germinating seeds at application rates ranging from 11.0 to 0.3 kg. active material/acre.

In the case of the seedling plants an assessment of the phytotoxic effect of the compound was made 12 days after spraying. This assessment was made on a 0–9 scale where 0 corresponds to no effect and 9 corresponds to dead or over 90% phytotoxicity. These figures were transformed to percentages and plotted as log probits. Regression lines were then drawn and the dosages required to give 10%, 50% and 90% phytotoxicity determined.

In the case of the soil containing germinating seeds, the assessment was made 3 weeks after spraying and phytotoxicity dosages determined as in the case of the foliar spray.

The results of these tests are given in Table 2.

16

Example XLVI.—Morphogenic and phytotoxic effects of compounds of the invention The morphogenic and phytotoxic effects of the compounds were determined against the four plant species linseed (L), mustard (M), ryegrass (R) and oat (O).

Pots containing seedling plants of these four species were sprayed with a solution of the test compound dissolved or suspended in acetone/water (1:1) containing 0.625% Triton X–155 as wetting agent; the application rate being equivalent to 10, 3.5, 1.0 or 0.35 lbs. active material/acre. Spraying of pots containing newly-sown seeds of the same species was also carried out.

Visual assessment of the effects of the compounds was made on two occasions after spraying and the results obtained are given in Table 3. In this table, for pre-emergence treatments, 0 indicates no effect, 1–4 indicates germination and/or growth inhibition and 5 indicates complete inhibition of germination. For post-emergence treatments, 0 indicates no effect, 1–4 indicate growth inhibition or senescene acceleration and 5 indicates complete growth inhibition or maximum senescene acceleration.

TABLE 2.—HERBICIDAL ACTIVITY OF 1-HYDROXY-β,2,6,6-TETRAMETHYL-4-OXO-2-CYCLOHEXENE-1-PENTA-CIS-2-TRANS-4-DIENOIC ACID, METHYL ESTER

|  | Phytotoxicity dose levels, percent | Maize [1] | Wheat [2] | Barley [3] | Oats [4] | Rice [5] | Ryegrass [6] | Cocksfoot [7] | Barnyard grass [8] | Crabgrass [9] | Couch grass [10] |
|---|---|---|---|---|---|---|---|---|---|---|---|
| Pre-emergence | 10 | >11 | 0.7 | 1.1 | | <0.4 | | <0.4 | <0.5 | <0.4 | |
|  | 50 | | 2.3 | 2.0 | | 0.6 | | <0.4 | <0.5 | 0.7 | |
|  | 90 | | 7.4 | 3.7 | | 2.7 | | 1.1 | <0.5 | 3.2 | |
| Foliar spray | 10 | 4.8 | 1.1 | 0.9 | <0.3 | | 4.8 | | 0.8 | 0.9 | >11 |
|  | 50 | >11 | >11 | 9.0 | 2.4 | | >11 | | 4.6 | 7.8 | |
|  | 90 | | | >11 | >11 | | | | >11 | >11 | |

|  | Phytotoxicity dose levels, percent | Cotton [11] | Kale [12] | Linseed [13] | Sugar beet [14] | Carrot [15] | Chicory [16] | Plantain [17] | Pigweed [18] | Fat hen [19] |
|---|---|---|---|---|---|---|---|---|---|---|
| Pre-emergence | 10 | 8.5 | <0.4 | 0.5 | | <0.4 | 0.7 | <0.4 | <0.4 | <0.4 |
|  | 50 | >11 | <0.4 | 1.2 | | <0.4 | 2.7 | <0.4 | <0.4 | <0 |
|  | 90 | | 3.5 | 2.8 | | 3.0 | >8 | <0.4 | 0.9 | 0.5 |
| Foliar spray | 10 | >8 | 1.0 | | >8 | >8 | >8 | 3.8 | | 1.7 |
|  | 50 | | >8 | | | | | >8 | | 4.7 |
|  | 90 | | | | | | | | | >8 |

[1] Zea mays. [2] Triticum vulgare. [3] Hordeum vulgare. [4] Avena sativa. [5] Oryza sativa. [6] Lolium perenne. [7] Dactylis glomerata. [8] Echinocloa crus-galli. [9] Digitaria sanguinalis. [10] Agropyron repens. [11] Gossypium barabdense. [12] Brassica oleracea. [13] Linum usitatisimum. [14] Beta vulgaris. [15] Dacus carota. [16] Chicorium endivia. [17] Plantago lanceolata. [18] Amaranthus retroflexus. [19] Chenopodium album.

TABLE 3

| Run No. | Compound | Dosage rate, lb./acre | Pre-emergence | | | | | | | | Post-emergence | | | | | | | | | | | | |
|---|---|---|---|---|---|---|---|---|---|---|---|---|---|---|---|---|---|---|---|---|---|---|---|
|  |  |  | | | | | | | | | L | | M | | | | L | | M | | | | |
|  |  |  | L | M | R | O | L | M | R | O | B | S | B | S | R | O | B | S | B | S | R | O |
|  |  |  | Day 4 | | | | Day 10 | | | | Day 4 | | | | | | Day 8 | | | | | | |
| 1 | 1-hydroxy-β,2,6,6-tetramethyl-4-oxo-2-cyclohexene-1-penta-cis-2-trans-4-dienoic acid, methyl ester. | 10 | 5 | 5 | 5 | 5 | 5 | 5 | 5 | 5 | 4 | 4 | 3 | 2 | 2 | 2 | 5 | 4 | 3 | 2 | 4 | 4 |
|  |  | 3.5 | 5 | 4 | 5 | 4 | 3 | 4 | 4 | 3 | 3 | 2 | 2 | 1 | 1 | 2 | 3 | 2 | 1 | 1 | 3 | 3 |
|  |  | 1.0 | 5 | 3 | 4 | 3 | 2 | 3 | 3 | 0 | 2 | 1 | 1 | 0 | 0 | 1 | 1 | 1 | 0 | 1 | 2 | 1 |
|  |  | 0.35 | 3 | 2 | 3 | 2 | 1 | 1 | 1 | 0 | 1 | 0 | 0 | 0 | 0 | 0 | 0 | 0 | 0 | 0 | 0 | 0 |
|  |  |  | Day 4 | | | | Day 10 | | | | Day 4 | | | | | | Day 7 | | | | | | |
| 2 | 1-hydroxy-β,2,6,6-tetramethyl-4-oxo-2-cyclohexene-1-penta-cis-2-trans-4-dienoic acid, ethyl ester. | 10 | 5 | 5 | 5 | 5 | 5 | 4 | 4 | 3 | 4 | 1 | 2 | 0 | 3 | 3 | 3 | 3 | 3 | 3 | 4 | 4 |
|  |  | 3.5 | 5 | 4 | 5 | 5 | 4 | 4 | 4 | 2 | 2 | 1 | 0 | 0 | 2 | 3 | 2 | 2 | 1 | 2 | 2 | 2 |
|  |  | 1.0 | 4 | 3 | 4 | 3 | 3 | 1 | 1 | 1 | 0 | 0 | 0 | 0 | 1 | 1 | 0 | 0 | 0 | 0 | 1 | 1 |
|  |  | 0.35 | 3 | 1 | 3 | 2 | 1 | 0 | 0 | 0 | 0 | 0 | 0 | 0 | 0 | 0 | 0 | 0 | 0 | 0 | 0 | 0 |
| 3 | 1-hydroxy-β,2,6,6-tetramethyl-4-oxo-2 cyclohexene-1-penta-cis-2-trans-4-dienoic acid, isopropyl ester. | 10 | 4 | 3 | 4 | 5 | 4 | 3 | 3 | 2 | 0 | 0 | 0 | 0 | 0 | 0 | 1 | 2 | 1 | 1 | 2 | 0 |
|  |  | 3.5 | 4 | 2 | 3 | 4 | 4 | 1 | 1 | 1 | 0 | 0 | 0 | 0 | 0 | 0 | 0 | 2 | 1 | 0 | 1 | 0 |
|  |  | 1.0 | 2 | 1 | 0 | 1 | 1 | 0 | 0 | 0 | 0 | 0 | 0 | 0 | 0 | 0 | 0 | 0 | 0 | 0 | 0 | 0 |
|  |  | 0.35 | 3 | 0 | 0 | 0 | 1 | 0 | 0 | 0 | 0 | 0 | 0 | 0 | 0 | 0 | 0 | 0 | 0 | 0 | 0 | 0 |
|  |  |  | Day 5 | | | | Day 10 | | | | Day 5 | | | | | | Day 8 | | | | | | |
| 4 | 1-hydroxy-β,2,6,6-tetramethyl-4-oxo-2-cyclohexene-1-penta-cis-2-trans-4-dienoic acid, imidazolide. | 10 | 3 | 4 | 4 | 3 | 2 | 4 | 3 | 2 | 3 | 1 | 0 | 1 | 3 | 2 | 2 | 1 | 2 | 1 | 3 | 0 |
|  |  | 3.5 | 4 | 4 | 3 | 2 | 3 | 3 | 2 | 1 | 2 | 0 | 1 | 2 | 2 | 1 | 1 | 0 | 1 | 2 | 3 | 1 |
|  |  | 1.0 | 0 | 2 | 2 | 1 | 0 | 0 | 1 | 0 | 0 | 1 | 0 | 0 | 2 | 1 | 0 | 1 | 0 | 0 | 2 | 0 |
|  |  | 0.35 | 0 | 0 | 0 | 1 | 0 | 0 | 0 | 0 | 0 | 0 | 1 | 0 | 0 | 1 | 0 | 0 | 0 | 0 | 0 | 0 |

TABLE 3.—Continued

| Run No. | Compound | Dosage rate, lb./acre | Pre-emergence | | | | | | | | Post-emergence | | | | | | | | | | | | | |
|---|---|---|---|---|---|---|---|---|---|---|---|---|---|---|---|---|---|---|---|---|---|---|---|---|
| | | | | | | | | | | | | L | | | | M | | | L | | | | M | | |
| | | | L | M | R | O | L | M | R | O | B | S | B | S | R | O | B | S | B | S | R | O |
| | | | Day 4 | | | | Day 10 | | | | Day 4 | | | | | | Day 7 | | | | | | |
| 5 | 1-hydroxy-4-methoxy-β,2,6,6-tetramethyl-2-cyclohexene-1-penta-cis-2-trans-4-dienoic acid, methyl ester (α stereoisomer). | 10 | 4 | 4 | 5 | 5 | 4 | 4 | 5 | 4 | 5 | 1 | 5 | 1 | 2 | 3 | 5 | --- | 4 | 2 | 2 | 3 |
| | | 3.5 | 4 | 4 | 5 | 5 | 4 | 3 | 5 | 4 | 5 | 1 | 5 | 0 | 2 | 3 | 4 | 2 | 4 | 1 | 1 | 3 |
| | | 1.0 | 3 | 2 | 4 | 2 | 3 | 0 | 3 | 1 | 4 | 0 | 4 | 0 | 1 | 2 | 4 | 1 | 2 | 0 | 0 | 1 |
| | | 0.35 | 2 | 1 | 3 | 1 | 2 | 0 | 2 | 0 | 3 | 0 | 3 | 0 | 0 | 1 | 2 | 0 | 1 | 0 | 0 | 1 |
| 6 | 1-hydroxy-4-methoxy-β,2,6-6-tetramethyl-2-cyclohexene-1-penta-cis-2-trans-4-dienoic acid, methyl ester (β stereoisomer). | 10 | 2 | 2 | 5 | 4 | 3 | 3 | 5 | 3 | 5 | --- | 2 | 3 | 4 | --- | 4 | --- | --- | 1 | 3 |
| | | 3.5 | 2 | 3 | 3 | 3 | 2 | 1 | 3 | 2 | 4 | 0 | 3 | 0 | 0 | 2 | 3 | 1 | 2 | 0 | 2 | 2 |
| | | 1.0 | 0 | 0 | 3 | 2 | 0 | 0 | 3 | 0 | 2 | 0 | 2 | 0 | 0 | 0 | 2 | 1 | 1 | 0 | 0 | 1 |
| | | 0.35 | 0 | 0 | 0 | 0 | 0 | 0 | 1 | 1 | 3 | 0 | 0 | 0 | 0 | 0 | 1 | 0 | 0 | 0 | 0 | 0 |
| 7 | 1,4-epidioxy-β,2,6,6-tetramethyl-2-cyclohexene-1-penta-cis-2-trans-4-dienoic acid, methyl ester. | 10 | 5 | 5 | 5 | 5 | 4 | 4 | 4 | 4 | 5 | 3 | 5 | 2 | 2 | 1 | 4 | 4 | 5 | 1 | 2 | 0 |
| | | 3.5 | 4 | 5 | 5 | 4 | 3 | 3 | 3 | 2 | 4 | 2 | 2 | 0 | 0 | 2 | 3 | 3 | 1 | 0 | 1 | 0 |
| | | 1.0 | 4 | 4 | 4 | 2 | 2 | 3 | 3 | 2 | 0 | 3 | 0 | 0 | 0 | 1 | 0 | 1 | 0 | 0 | 0 | 0 |
| | | 0.35 | 3 | 3 | 3 | 1 | 1 | 1 | 1 | 0 | 3 | 0 | 0 | 0 | 0 | 0 | 1 | 0 | 0 | 0 | 0 | 0 |
| 8 | 1-hydroxy-β,2,6,6-tetramethyl-4-oxo-2-cyclohexene-1-penta-cis-2-trans-4-dienoic acid, n-propyl ester. | 10 | 4 | 4 | 5 | 4 | 4 | 3 | 4 | 3 | 5 | 2 | 5 | 1 | 1 | 3 | 4 | 2 | 4 | 1 | 2 | 2 |
| | | 3.5 | 3 | 4 | 4 | 3 | 1 | 3 | 3 | 2 | 3 | 1 | 3 | 0 | 0 | 2 | 3 | 1 | 3 | 0 | 1 | 1 |
| | | 1.0 | 1 | 3 | 3 | 2 | 0 | 0 | 1 | 0 | 2 | 0 | 2 | 0 | 0 | 1 | 2 | 0 | 2 | 0 | 0 | 0 |
| | | 0.35 | 0 | 2 | 2 | 1 | 0 | 0 | 1 | 0 | 2 | 0 | 1 | 0 | 0 | 0 | 1 | 0 | 1 | 0 | 0 | 0 |
| 9 | 1-hydroxy-β,2,6,6-tetramethyl-4-oxo-2-cyclohexene-1-penta-cis-2-trans-4-dienoic acid, phenyl ester. | 10 | 4 | 4 | 5 | 4 | 3 | 1 | 4 | 2 | 5 | 2 | 5 | 1 | 3 | 3 | 4 | 5 | 4 | 2 | 4 | 4 |
| | | 3.5 | 3 | 3 | 3 | 3 | 1 | 0 | 2 | 1 | 5 | 2 | 4 | 0 | 2 | 2 | 4 | 4 | 3 | 1 | 3 | 3 |
| | | 1.0 | 2 | 3 | 4 | 2 | 0 | 0 | 1 | 0 | 4 | 1 | 3 | 0 | 1 | 2 | 3 | 2 | 2 | 0 | 2 | 2 |
| | | 0.35 | 1 | 2 | 2 | 1 | 0 | 0 | 0 | 0 | 3 | 0 | 2 | 0 | 0 | 1 | 2 | 0 | 1 | 0 | 1 | 1 |
| | | | Day 4 | | | | Day 10 | | | | Day 4 | | | | | | Day 7 | | | | | | |
| 10 | β,2,6,6-tetramethyl-4-oxo-2-cyclohexene-1-penta-cis/trans-2-4-dienoic acid, methyl ester (mixture of geometric isomers). | 10 | 4 | 4 | 5 | 5 | 4 | 3 | 4 | 4 | 3 | --- | --- | 2 | 1 | | Not assessed | | | | | |
| | | 3.5 | 2 | --- | 4 | 4 | 1 | 0 | 2 | 1 | 3 | 1 | 2 | 0 | 1 | 0 | 3 | --- | 3 | 1 | 0 | 0 |
| | | 1.0 | 1 | 2 | 2 | 0 | 1 | 1 | 0 | 1 | 2 | 0 | 1 | 0 | 0 | 0 | | Not assessed | | | | |
| | | 0.35 | 0 | 0 | 1 | 0 | 0 | 0 | 0 | 0 | 0 | 0 | 0 | 0 | 0 | 0 | 1 | 2 | 2 | 0 | 0 | 0 |
| 11 | 1,4-dihydroxy-β,2,6,6-tetramethyl-2-cyclohexene-1-penta-cis-2-trans-4-dienoic acid (mixture of stereoisomers). | 10 | 5 | 5 | 5 | 5 | 3 | 3 | 2 | 2 | 5 | 2 | 5 | 2 | 2 | 4 | 5 | 4 | 5 | 2 | 3 | 3 |
| | | 3.5 | 4 | 5 | 5 | 5 | 2 | 2 | 1 | 2 | 4 | 1 | 4 | 1 | 0 | 3 | 4 | 3 | 4 | 1 | 2 | 2 |
| | | 1.0 | 3 | 5 | 4 | 4 | 1 | 1 | 0 | 0 | 3 | 0 | 3 | 0 | 0 | 0 | 3 | 1 | 3 | 0 | 0 | 0 |
| | | 0.35 | 2 | 4 | 2 | 2 | 0 | 0 | 0 | 0 | 2 | 0 | 2 | 0 | 0 | 0 | 1 | 0 | 2 | 0 | 0 | 0 |
| 12 | 1,4-dihydroxy-β,2,6,6-tetramethyl-2-cyclohexene-1-penta-cis-2-trans-4-dienoic acid, methyl ester (mixture of stereoisomers). | 10 | 5 | 5 | 5 | 5 | 4 | 5 | 4 | 4 | 5 | 2 | 5 | 2 | 1 | 4 | 5 | 3 | 5 | 2 | 3 | 3 |
| | | 3.5 | 5 | 5 | 5 | 5 | 4 | 4 | 3 | 2 | 4 | 1 | 5 | 1 | 0 | 3 | 4 | 2 | 4 | 1 | 2 | 3 |
| | | 1.0 | 4 | 5 | 4 | 4 | 2 | 3 | 2 | 2 | 3 | 0 | 4 | 0 | 0 | 0 | 3 | 1 | 3 | 0 | 1 | 0 |
| | | 0.35 | 4 | 4 | 3 | 3 | 2 | 1 | 1 | 1 | 2 | 0 | 3 | 0 | 0 | 0 | 1 | 0 | 2 | 0 | 0 | 0 |

Example XLVII.—Inhibition of germination of seeds by compounds of the invention

Solutions of the test compounds were prepared by dissolving samples in phosphate buffer containing 1% acetone and subsequently making serial dilutions of these stock solutions. Linseed (variety Lapwing) seeds were incubated with these solutions in darkness at 22° C. After 2 days, corresponding to complete germination of untreated seeds, the number of seeds germinated at each concentration of the compounds was scored and this value plotted against the concentration of the compound using a log probit scale.

The concentration of compound required to inhibit germination in half the seeds ($GID_{50}$) was then calculated for each compound. The results obtained in this experiment are given in Table 4.

TABLE 4

| Run No. | Compound | $GID_{50}$ (Two days) |
|---|---|---|
| 1 | 1-hydroxy-β,2,6,6-tetramethyl-4-oxo-2-cyclohexene-1-penta-cis-2-trans-4-dienoic acid, methyl ester. | $1.3 \times 10^{-7}$ M |
| 2 | 1-hydroxy-β,2,6,6-tetramethyl-4-oxo-2-cyclohexene-1-penta-trans-2-trans-4-dienoic acid, methyl ester. | $2.3 \times 10^{-6}$ M |
| 3 | 1-hydroxy-β,2,6,6-tetramethyl-4-oxo-2-cyclohexene-1-penta-cis-2-trans-4-dienoic acid, ethyl ester. | $4.4 \times 10^{-7}$ M |
| 4 | 1-hydroxy-β,2,6,6-tetramethyl-4-oxo-2-cyclohexene-1-penta-cis-2-trans-4-dienoic acid, n-propyl ester. | $2.2 \times 10^{-6}$ M |
| 5 | 1-hydrox-β,2,6,6-tetramethyl-4-oxo-2-cyclohexene-1-penta-cis-2-trans-4-dienoic acid, isopropyl ester. | $3.5 \times 10^{-6}$ M |
| 6 | 1-hydroxy-β,2,6,6-tetramethyl-4-oxo-2-cyclohexene-1-penta-cis-2-trans-4-dienoic acid, n-butyl ester. | $1.1 \times 10^{-5}$ M |
| 7 | 1-hydroxy-β,2,6,6-tetramethyl-4-oxo-2-cyclohexene-1-penta-cis-2-trans-4-dienoic acid, n-pentyl ester. | $4.5 \times 10^{-5}$ M |
| 8 | 1-hydroxy-β,2,6,6-tetramethyl-4-oxo-2-cyclohexene-1-penta-cis-2-trans-4-dienoic acid, phenyl ester. | $1.9 \times 10^{-7}$ M |
| 9 | 1-hydroxy-β,2,6,6-tetramethyl-4-oxo-2-cyclohexene-1-penta-cis-2-trans-4-dienoic acid, m-trifluoromethylphenyl ester. | $4.1 \times 10^{-7}$ M |
| 10 | 1-hydroxy-β,2,6,6-tetramethyl-4-oxo-2-cyclohexene-1-penta-cis-2-trans-4-dienoic acid, m-methylsulfonylphenyl ester. | $8.0 \times 10^{-7}$ M |

TABLE 4—Continued

| Run No. | Compound | $GID_{50}$ (Two Days) |
|---|---|---|
| 11 | 1-hydroxy-β,2,6,6-tetramethyl-4-oxo-2-cyclohexene-1-penta-cis/trans-2-trans-4-dienoic acid, p-methyl sulfonylphenyl ester. | $1.9 \times 10^{-6}$ M |
| 12 | 1-hydroxy-β,2,6,6-tetramethyl-4-oxo-2-cyclohexene-1-penta-cis-2-trans-4-dienoic acid, p-nitrophenyl ester. | $9.3 \times 10^{-6}$ M |
| 13 | 1-hydroxy-β,2,6,6-tetramethyl-4-oxo-cyclohexane-1-pentanoic acid, methyl ester. | $4.0 \times 10^{-6}$ M |
| 14 | 1-hydroxy-4-methoxy-β,2,6,6-tetramethyl-2-cyclohexene-1-penta-cis-2-trans-4-dienol. | $1.6 \times 10^{-5}$ M |
| 15 | 1,4-dihydroxy-β,2,6,6-tetramethyl-2-cyclohexene-1-penta-cis-2-trans-4-dienoic acid, methyl ester. | $1.7 \times 10^{-7}$ M |
| 16 | 1,4-dihydroxy-β,2,6,6-tetramethyl-2-cyclohexene-1-penta-cis-2-trans-4-dienoic acid. | $6.1 \times 10^{-7}$ M |

Example XLVIII.—Enhancement of cotyledon drop in cotton by compounds of the invention The cotyledons of germinating cotton seedlings were dipped into a solution of 1-hydroxy-β,2,6,6-tetramethyl-4-oxo-2-cyclohexene-1-penta-cis-2-trans - 4 - dienoic acid methyl ester ($5 \times 10^{-4}$ M) in 50% aqueous acetone containing 0.63% Triton X–100 as wetting agent. Seedlings were also dipped into a similar solution in which the active ingredient had been omitted; sixty plants being used for each treatment.

The number of cotyledons abscissed, expressed as a percentage of the total number in the treatment, was recorded after 6 and 11 days. The results obtained are given in Table 5.

TABLE 5

| Treatment | Cotyledon drop (percentage) | |
|---|---|---|
| | Day 6 | Day 11 |
| Control | 0 | 47 |
| 1-hydroxy-β,2,6,6-tetramethyl-4-oxo-2-cyclohexene-1-penta-cis-2-trans-4-dienoic acid methyl ester | 0 | 69 |

I claim as my invention:
1. A compound of the formula:

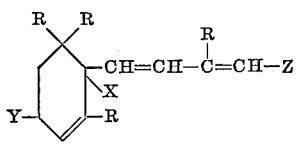

wherein Z is

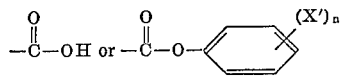

wherein X' is lower alkylsulfonyl, nitro or halomethyl; each R is independently hydrogen or lower alkyl; X is hydrogen or hydroxy; Y is hydroxy, oxo, or lower alkoxy; and $n$ is 0 or 1; with the proviso that when Z is

Y is hydroxy, or lower alkoxy.

2. The compound of claim 1 wherein R is methyl and X is hydroxy.

3. The compound of claim 2 wherein Z is

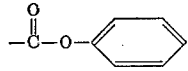

4. The compound of claim 3 wherein Y is oxo.

References Cited

Koshimizv et al., Agr. Biol. Chem., 30, 941, 1966.
Cornforth et al., Nature, 205, 1269, 1965.
Bulletin of Society of Chimé Fr. 1966 (12), 3874–8.

LORRAINE A. WEINBERGER, Primary Examiner

R. GERSTL, Assistant Examiner

U.S. Cl. X.R.

71—92, 103, 106, 113; 260—309, 340.6, 464, 473, 514, 557, 586, 590, 611, 617